Figure 1:
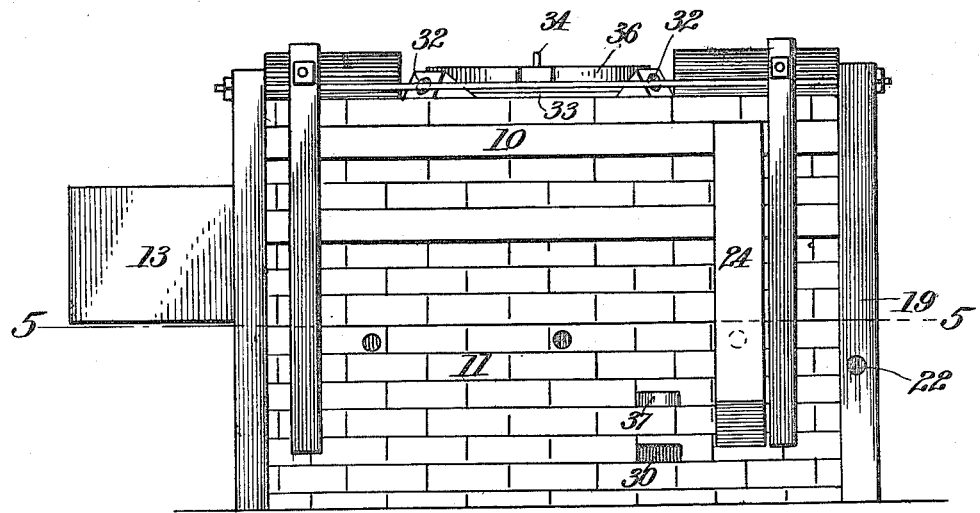

L. A. THORNBURG.
GLASS DRAWING APPARATUS.
APPLICATION FILED DEC. 3, 1914.

1,163,487.

Patented Dec. 7, 1915.
3 SHEETS—SHEET 1.

Witnesses
C. M. Walker,
M. E. Smith

Inventor
Lincoln A. Thornburg
By Hodges & Hodges
Attorneys

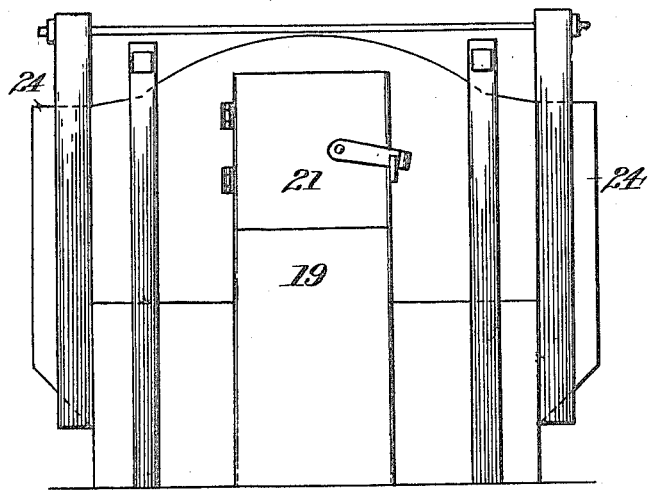
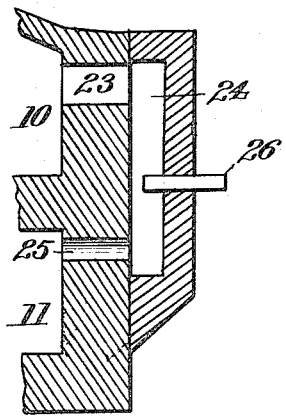
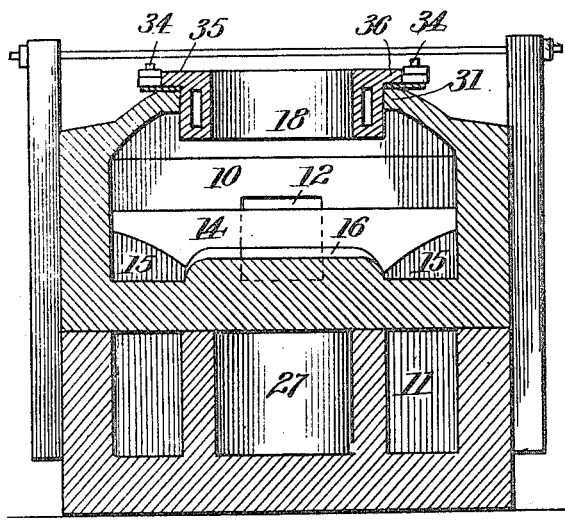

UNITED STATES PATENT OFFICE.

LINCOLN A. THORNBURG, OF MUNCIE, INDIANA, ASSIGNOR OF ONE-HALF TO L. SHERMAN SKELTON, OF OKMULGEE, OKLAHOMA.

GLASS-DRAWING APPARATUS.

1,163,487. Specification of Letters Patent. Patented Dec. 7, 1915.

Application filed December 3, 1914. Serial No. 875,238.

*To all whom it may concern:*

Be it known that I, LINCOLN A. THORNBURG, a citizen of the United States, residing at Muncie, in the county of Delaware and State of Indiana, have invented new and useful Improvements in Glass-Drawing Apparatus, of which the following is a specification.

This invention is an improved forehearth for glass drawing furnaces, being particularly designed for use in drawing window and plate glass.

Experience in drawing glass from the various types of forehearths now in general use, demonstrates that in cooling the glass down in order to get production, the bottom becomes so much cooler than the top that it makes rough glass, glass knots, and produces a bad quality.

One of the objects of the present invention is to overcome this difficulty by providing means for controlling the heat at the bottom, and by using no heat around the top of the drawing point, with the exception of that which is necessary to sever the cylinders where drawn.

A further object is to provide a heating chamber below the drawing chamber, so arranged that the heat circles around the outer part of said heating chamber and then passes into a center flue directly under the drawing point in the drawing chamber.

A further object is to so apply the heat to the bottom of the drawing point, as to regulate the temperature of glass to a working condition, the same as is done in a drawing pot.

A further object is to provide means to obtain a top chill of the right width and thickness to draw a cylinder without chilling the entire surface of glass, thereby permitting of a speedy draw from the top while the heat from the bottom keeps the material in a proper molten condition.

The invention will be hereinafter fully set forth and particularly pointed out in the claims.

Figure 2:
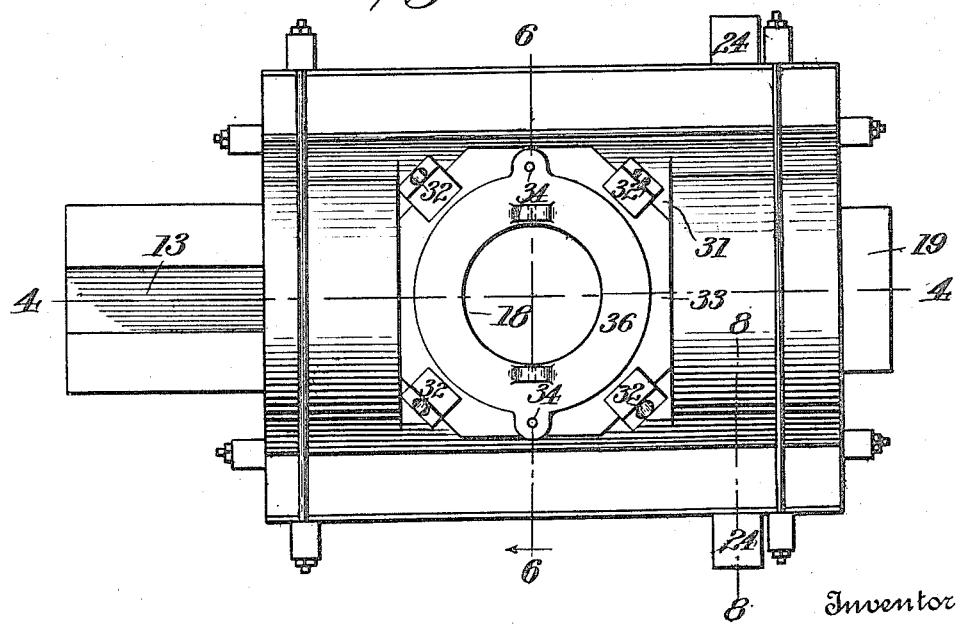
Figure 5:
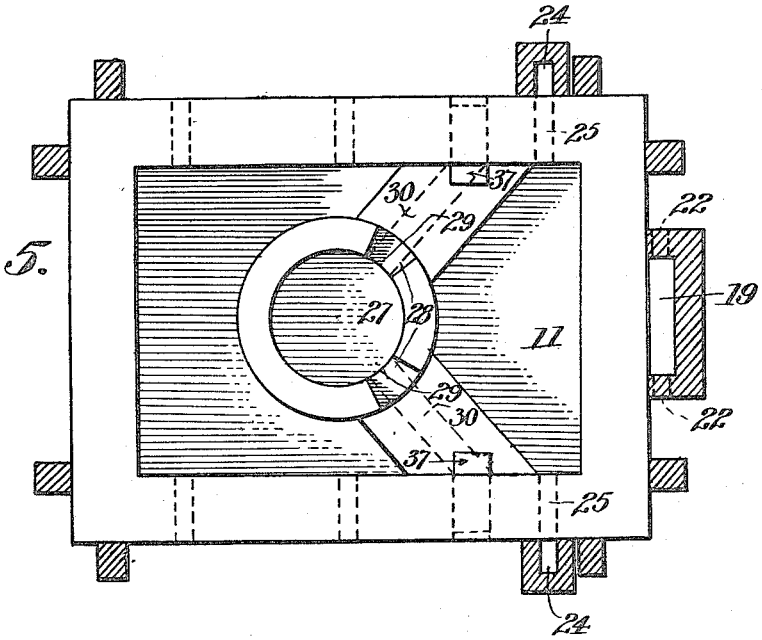
Figure 4:
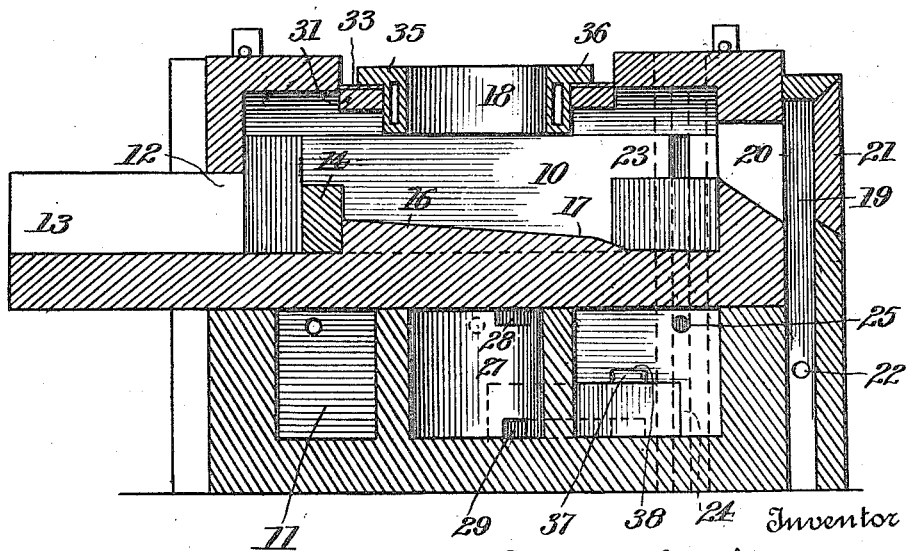

In the accompanying drawings: Figure 1 is a side elevation illustrating my improved forehearth. Fig. 2 is a plan view. Fig. 3 is a front end view. Fig. 4 is a vertical sectional view on the line 4—4, Fig. 2. Fig. 5 is a horizontal sectional view on the line 5—5, Fig. 1. Fig. 6 is a transverse sectional view of the drawing chamber on the line 6—6, Fig. 2. Fig. 7 is a detail sectional view of the center flue. Fig. 8 is a detail sectional view on line 8—8, Fig. 2.

Referring to the drawings, 10 designates the drawing chamber, and 11 the heating chamber immediately beneath the drawing chamber. The drawing chamber is provided with an inlet opening 12 through which molten glass is introduced into the drawing chamber, from a melting chamber (not shown), by means of a suitable channel or conduit 13. A protecting wall 14 extends transversely of the drawing chamber a short distance from the opening 12, to protect the drawing point from the heat of the melting tank. The ends of the said protecting wall are beveled upward to form openings or passages 15, through which the incoming glass flows, the location of the passages 15 being such that the incoming glass is first caused to pass around the outer portion of the drawing chamber before it reaches the drawing point. In this manner the glass is cooler at the drawing point than it would be if it was allowed to flow directly to the drawing point. The bottom wall of the drawing chamber is thickened, is indicated at 16, the top surface of said bottom being sloped downwardly away from the protecting wall 14, to allow the deepest body of glass at the melting back and skimming point, indicated at 17, the shallowest body being at the drawing point immediately beneath the center hole 18. By this arrangement, the greatest amount of heat penetrates where the bottom is thinnest, *i. e.* at the melting back point where the maximum heat is required.

The skimming flue 19 communicates with the drawing chamber at the melting back point, through an opening 20, said flue being provided with a suitable door 21, normally kept closed. Said skimming flue is also provided with burner holes 22. The side walls of the drawing chamber are provided with outlet openings 23 above the glass level, which openings communicate with flues 24 provided with outlets 25 passing through the side walls of the heating chamber and communicating with the interior of the latter. Dampers 26 are provided in the flues 24 to regulate the heat at the skimming point. The heating chamber is provided with a center flue 27 the top of which is closed by the bottom wall of the drawing chamber, suitable inlet openings 28 being provided near the top of said center flue. It will be noted that the center flue 27 is immediately beneath the drawing point. Said center flue is provided with outlet openings 29 near its bottom, which openings communicate with outlet conduits 30 leading to the stack.

In operation, the heat from the burners 22 passes upwardly through the skimming flue 19, through the opening 20 over the surface of the glass at the skimming point, and from thence through the outlets 23 into the flues 24. Said flues deliver the heat into the heating chamber 11 through the outlets 25, and from the chamber 11 the heat passes through openings 28 into the center flue 27, and from thence through the conduits 30 to the stack. In this manner I utilize the same heat for the skimming flue, the melting back chamber, and the heating chamber.

The center hole 18 is formed in the usual clay stone center 31 in the arch shaped cap of the forehearth. The center stone is provided with four burner holes 32 pointing to the center of the opening, being utilized for severing or burning off cylinders after the drawing operation has been completed. In order to protect the center stone from wear incident to the hanging of pipes, or doing other necessary work over it, I provide a protecting plate 33 of metal, and to said protecting plate I secure in any desired manner, guide pins 34, which serve to guide the cooling ring 35. Said cooling ring is made hollow to receive a suitable cooling medium, such as air or water, and is provided with a flange 36 at the top to keep any broken glass or dirt from falling between the ring and the center stone, which would interfere with the action of the chilling ring.

Heretofore it has been common practice, when drawing a cylinder from a deep body of glass, to employ a clay ring or clay pot to draw from, in order to guide the cylinder as it is drawn upward. Otherwise, the cylinder would be crooked and uneven in thickness. This practice is objectionable, however, as it is impossible to skim thoroughly after the cylinder is severed, for the reason that the cold glass adheres to the clay. This difficulty is overcome by the use of the chilling ring 35 which chills a ring of glass on the surface, and as the cylinder is drawn from the center of the chilled portion, the ring acts as a guide to the cylinder, and makes an even thickness, and easily skimmed. This ring 35 may be raised or lowered by any suitable apparatus (not shown), to any suitable distance above the surface of the molten glass. If a single strength cylinder is desired, the ring will be raised farther away from the surface of the glass than for a double strength cylinder. Thus the desired thickness may be obtained without altering the speed of the drawing machine. Another important advantage of the chilling ring is that by means thereof the surface of the glass is cooled evenly all around, thereby insuring the production of a uniform cylinder when drawn, the necessary space being chilled all around without chilling the entire surface of the glass to secure the proper drawing temperature. When the cylinder has been drawn to a suitable height ready to be taken down, the cooling ring 35 is lifted, and the four burners 32 are caused to direct their heat against the cylinder to sever the latter from the molten glass, and as soon as the cylinder is swung out of the way, the skimmer is inserted and skims the residue back into the melting back chamber. The heat that comes into the drawing chamber from the skimming flue and passing out through the flues 24, together with the heat in the heating chamber 11, melts the skimmed glass back to proper working temperature while the next cylinder is being drawn, thereby avoiding delay in the drawing operation. Any time the cold glass is not melted back properly, or should any cold glass, seeds or blisters still remain, the door 21 may be opened and glass skimmed down into the flue 19 and into the cellar below without interfering with the drawing operation. Any time the glass at the drawing point becomes too hot from the center flue 27, dampers 37 may be opened to permit the heat to be drawn out of the chamber 11 through openings 38 into the stack.

Having thus explained the nature of my invention and described an operative manner of constructing and using the same, although without attempting to set forth all of the forms in which it may be made, or all of the forms of its use, what I claim is:—

1. An improvement in glass drawing apparatus comprising a forehearth provided with a drawing chamber, and a heating chamber beneath said drawing chamber, and provided with means for directing heat against the bottom of said drawing chamber at the drawing point.

2. An improvement in glass drawing apparatus comprising a forehearth provided with a drawing chamber, and a heating chamber beneath said drawing chamber and provided with means for directing heat against the bottom of said drawing chamber at the drawing point, and means for controlling the heat applied to the bottom of said drawing chamber.

3. An improvement in glass drawing apparatus comprising a forehearth provided with a drawing chamber, a heating chamber, means for causing heat to pass over a portion of the glass in said drawing chamber, and means for conducting heat from said drawing chamber to said heating chamber.

4. An improvement in glass drawing apparatus comprising a forehearth provided with a drawing chamber, a heating chamber beneath said drawing chamber, means independent of said heating chamber for causing heat to pass over a portion of the glass in said drawing chamber, and means for conducting said heat from the drawing chamber to said heating chamber.

5. An improvement in glass drawing apparatus comprising a forehearth provided with a drawing chamber, a heating chamber beneath said drawing chamber, means for causing heat to pass over a portion of the glass in said drawing chamber, and means for conducting the heat from said drawing chamber to a point within the heating chamber immediately beneath the drawing point in said drawing chamber.

6. An improvement in glass drawing apparatus comprising a forehearth provided with a drawing chamber, a heating chamber beneath said drawing chamber, a skimming flue communicating with said drawing chamber, means for supplying heat to said flue, and means for conducting said heat across the surface of a portion of the glass within said drawing chamber and into said heating chamber.

7. An improvement in glass drawing apparatus comprising a forehearth provided with a drawing chamber, a heating chamber beneath said drawing chamber, a skimming flue communicating with said drawing chamber, means for supplying heat to said flue, means for conducting said heat across the surface of a portion of the glass within said drawing chamber and into said heating chamber, and means within said heating chamber for directing said heat against the bottom of the drawing chamber.

8. An improvement in glass drawing apparatus comprising a forehearth provided with a drawing chamber, a heating chamber beneath the drawing chamber, a skimming flue communicating with said drawing chamber above the level of the glass within the latter, means for supplying heat to said flue, and flues leading from the drawing chamber to said heating chamber.

9. An improvement in glass drawing apparatus comprising a forehearth provided with a drawing chamber, a heating chamber beneath the drawing chamber, a skimming flue communicating with said drawing chamber above the level of the glass within the latter, means for supplying heat to said flue, flues for conducting said heat to the interior of said heating chamber, and means within said heating chamber for directing said heat against the bottom of said drawing chamber.

10. An improvement in glass drawing apparatus comprising a forehearth provided with a drawing chamber, a heating chamber beneath the drawing chamber, means for introducing heat into said drawing chamber above the surface of the glass within the latter, means for conducting said heat from the drawing chamber to the interior of said heating chamber, and a center flue beneath the drawing point of said drawing chamber and forming the outlet for said heating chamber.

11. An improvement in glass drawing apparatus comprising a forehearth provided with a drawing chamber, a heating chamber beneath the drawing chamber, a skimming flue communicating with said drawing chamber above the level of the glass within the latter, means for supplying heat to said flue, flues for conducting said heat from the drawing chamber to the interior of said heating chamber, and a center flue in said heating chamber forming the outlet for said heat.

12. An improvement in glass drawing apparatus comprising a forehearth provided with a drawing chamber, a heating chamber beneath the drawing chamber, a skimming flue communicating with said drawing chamber, means for supplying heat to said flue, a center flue within said heating chamber, means for conducting said heat to said center flue, and heat outlet means independent of said flue.

13. An improvement in glass drawing apparatus comprising a forehearth provided with a drawing chamber, a heating chamber beneath the drawing chamber, means for introducing heat into said drawing chamber, a center flue within said heating chamber, means for conducting said heat from the drawing chamber to said center flue, and heat outlet means independent of said center flue.

14. A glass drawing apparatus comprising a forehearth provided with a drawing chamber having an inlet opening, and means within said drawing chamber for causing the molten glass to flow around the central portion of said chamber, and means for applying heat directly to said central portion.

15. An improvement in glass drawing apparatus comprising a forehearth provided with a drawing chamber having an inlet opening, and a protecting wall within said chamber opposite said inlet opening, said wall being provided with openings at its ends to cause the incoming glass to flow around the central portion of said drawing chamber, and means for applying heat directly to said central portion.

16. An improvement in glass drawing apparatus comprising a forehearth provided with a drawing chamber having an inlet opening and a bottom wall having a central portion sloping downwardly away from said opening, and means for applying heat directly to the sloping portion of said bottom wall.

17. An improvement in glass drawing apparatus comprising a forehearth provided with a drawing chamber having an inlet opening and a bottom wall having a central portion sloping downwardly away from said opening, means within the drawing chamber for causing the inflowing molten glass to flow around the central portion of said chamber, and means for applying heat directly to said central portion.

18. An improvement in glass drawing apparatus comprising a forehearth provided with a drawing chamber having an inlet opening and a bottom wall having a central portion sloping downwardly away from said opening, a protecting wall within said chamber opposite said opening and provided with openings in its ends to cause the incoming glass to flow around the central portion of said chamber, and means for applying heat to said central portion.

19. An improvement in glass drawing apparatus comprising a forehearth provided with a drawing chamber having an inlet opening, means within the drawing chamber for causing the molten glass to flow around the central portion of said chamber, means for introducing heat into said drawing chamber above the surface of the glass therein, and means for conducting said heat from said chamber to a point beneath said central portion.

20. An improvement in glass drawing apparatus comprising a forehearth provided with a drawing chamber having an inlet opening and a bottom wall having a central portion sloping downwardly from said opening, means for introducing heat into said drawing chamber above the glass therein, and means for conducting said heat from said chamber to a point beneath the sloping portion of said bottom wall.

21. An improvement in glass drawing apparatus comprising a forehearth provided with a drawing chamber having an inlet opening means within the drawing chamber for causing the molten glass to flow around the central portion of said chamber, a heating chamber beneath said drawing chamber, means for introducing heat into said drawing chamber above the surface of the glass therein, and means for conducting said heat from the drawing chamber to the interior of the heating chamber.

22. An improvement in glass drawing apparatus comprising a forehearth provided with a drawing chamber having an inlet opening and a bottom wall having a central portion sloping downwardly away from said opening, a heating chamber beneath said drawing chamber, means for introducing heat to said drawing chamber above the surface of the glass therein, and means for conducting said heat from the drawing chamber to the interior of said heating chamber.

23. An improvement in glass drawing apparatus comprising a forehearth provided with a drawing chamber having an inlet opening and a bottom wall having a central portion sloping downwardly away from said opening, means within the drawing chamber for causing the inflowing molten glass to flow around the central portion of said chamber, means for introducing heat into said drawing chamber above the surface of the glass therein, and means for conducting said heat from said chamber to a point beneath said central portion.

24. An improvement in glass drawing apparatus comprising a forehearth provided with a drawing chamber having an inlet opening and a bottom wall having a central portion sloping downwardly away from said opening, means within the drawing chamber for causing the inflowing molten glass to flow around the central portion of said chamber, a heating chamber beneath said drawing chamber, means for introducing heat into the drawing chamber above the level of the glass therein, and means for conducting said heat from the drawing chamber to the interior of said heating chamber.

25. An improvement in glass drawing apparatus comprising a forehearth provided with a center hole in the top thereof, a cooling ring located within said center hole, means supported by the forehearth for guiding said cooling ring.

26. An improvement in glass drawing apparatus comprising a forehearth provided with a center hole in the top thereof, a cooling ring located within said center hole and provided with a flange resting on said top, and means supported by the forehearth and coöperating with said flange to guide said ring.

27. An improvement in glass drawing apparatus comprising a forehearth provided with a center hole, a cover plate, a cooling ring located in said center hole, and means carried by said cover plate for guiding said cooling ring.

In testimony whereof I have hereunto set my hand in presence of two subscribing witnesses.

LINCOLN A. X THORNBURG.

Witnesses:
JOHN F. MEREDITH,
CLARA E. THORNBURG.